(12) United States Patent
Wei et al.

(10) Patent No.: US 10,779,343 B2
(45) Date of Patent: Sep. 15, 2020

(54) COMMUNICATIONS DEVICE AND METHOD FOR TRANSMITTING DATA IN RESOURCES CORRESPONDING TO A BUFFER STATUS REPORT

(71) Applicant: Sony Corporation, Tokyo (JP)

(72) Inventors: Yuxin Wei, Basingstoke (GB); Brian Alexander Martin, Basingstoke (GB); Hideji Wakabayashi, Basingstoke (GB); Shinichiro Tsuda, Basingstoke (GB); Chrysovalantis Kosta, Basingstoke (GB)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 16/313,055

(22) PCT Filed: May 9, 2017

(86) PCT No.: PCT/EP2017/061048
§ 371 (c)(1),
(2) Date: Dec. 24, 2018

(87) PCT Pub. No.: WO2017/220248
PCT Pub. Date: Dec. 28, 2017

(65) Prior Publication Data
US 2019/0166640 A1    May 30, 2019

(30) Foreign Application Priority Data

Jun. 24, 2016 (EP) .................................... 16176296

(51) Int. Cl.
*H04W 76/14* (2018.01)
*H04W 88/04* (2009.01)
(Continued)

(52) U.S. Cl.
CPC ............. *H04W 76/14* (2018.02); *H04W 4/70* (2018.02); *H04W 28/10* (2013.01); *H04W 72/02* (2013.01);
(Continued)

(58) Field of Classification Search
CPC . H04W 76/14; H04W 72/1252; H04W 28/10; H04W 72/02; H04W 88/04;
(Continued)

(56) References Cited

U.S. PATENT DOCUMENTS

2012/0236782 A1* 9/2012 Bucknell ........... H04W 72/1221
370/315
2016/0338095 A1* 11/2016 Faurie ................ H04W 28/0278
(Continued)

FOREIGN PATENT DOCUMENTS

WO    2011/077065 A1    6/2011
WO    2017/080782 A1    5/2017

OTHER PUBLICATIONS

Holma et al., "LTE for UMTS OFDMA and SC-FDMA Based Radio Access", System Architecture based on 3GPP SAE, ISBN 978-0-470-99401-6, Wiley 2009, 4 pages.
(Continued)

*Primary Examiner* — Walli Z Butt
(74) *Attorney, Agent, or Firm* — Xsensus LLLP

(57) ABSTRACT

A communications device acting as a rely device is configured to transmit a buffer status report message indicating that the buffer is storing data received from the infrastructure equipment for transmission to a remote communications device, when predetermined conditions are satisfied or a trigger event occurs so that the transmission of the data to the remote communications device can make more efficient use of communications resources to transmit the data or the remote communications device receives the data when the
(Continued)

remote communications device is in a state in which it should receive the data, for example when not in a reduced power state.

11 Claims, 12 Drawing Sheets

(51) Int. Cl.
    *H04W 4/70*     (2018.01)
    *H04W 28/10*    (2009.01)
    *H04W 72/02*    (2009.01)
    *H04W 72/12*    (2009.01)

(52) U.S. Cl.
    CPC ....... *H04W 72/1252* (2013.01); *H04W 88/04* (2013.01); *Y02D 70/00* (2018.01); *Y02D 70/1226* (2018.01); *Y02D 70/1242* (2018.01); *Y02D 70/1262* (2018.01); *Y02D 70/21* (2018.01); *Y02D 70/26* (2018.01)

(58) Field of Classification Search
    CPC ..... H04W 4/70; Y02D 70/1226; Y02D 70/00; Y02D 70/21; Y02D 70/26; Y02D 70/1242; Y02D 70/1262
See application file for complete search history.

(56) References Cited

U.S. PATENT DOCUMENTS

2018/0054755 A1*   2/2018  Lee .................. H04W 28/0278
2018/0317210 A1*  11/2018  Zhang ............... H04W 72/1278

OTHER PUBLICATIONS

Qualcomm Incorporated, "New Work Item: NarrowBand IOT NB-IOT", RP-151621, 3GPP TSG RAN Meeting #69, Phoenix, USA, Sep. 14-16, 2015, 8 pages.

Qualcomm Incorporated et al., "Further Enhancements to LTE Device to Device, UE to Network Relays for IoT and Wearables", RP-160677, 3GPP TSG RAN Meeting #71, Gothenburg, Sweden, Mar. 7-10, 2016, 7 pages.

Ericsson, "Relaying scenarios for wearables", Tdoc R2-163949, 3GPP TSG-RAN WG2 #94, Nanjing, P.R. China, May 23-27, 2016, pp. 1-7.

International Search Report dated Nov. 28, 2017 for PCT/EP2017/061048 filed on May 9, 2017, 9 pages.

* cited by examiner

| Destination Index 1 (e.g. UE-to-Network relay) | LCG ID 1_0 | Buffer Size 1_0 |
|---|---|---|
| Buffer Size 1_0 | LCG ID 1_1 | Buffer Size 1_1 |
| Buffer Size 1_1 | LCG ID 1_2 | Buffer Size 1_2 |
| Buffer Size 1_2 | LCG ID 1_3 | Buffer Size 1_3 |
| Buffer Size 1_3 | Destination Index 2 (e.g. the other remote UE) ||
| LCG ID 2_0 | Buffer Size 2_0 ||
| LCG ID 2_1 | Buffer Size 2_1 ||
| LCG ID 2_2 | Buffer Size 2_2 ||
| LCG ID 2_3 | Buffer Size 2_2 ||

........

| Destination Index N (e.g. the other remote UE) | LCG ID N_0 | Buffer Size N_0 |
|---|---|---|
| Buffer Size N_0 | LCG ID N_1 | Buffer Size N_1 |
| Buffer Size N_1 | LCG ID N_2 | Buffer Size N_2 |
| Buffer Size N_2 | LCG ID N_3 | Buffer Size N_3 |
| Buffer Size N_3 | Reserved Bits ||

BSR_A MAC CE

FIG. 13

COMMUNICATIONS DEVICE AND METHOD FOR TRANSMITTING DATA IN RESOURCES CORRESPONDING TO A BUFFER STATUS REPORT

CROSS-REFERENCE TO RELATED APPLICATIONS

This application is a National Stage Application based on PCT/EP2017/061048, filed on 9 May 2017, and claims priority to European Patent Application No. 16176296.8, filed on 24 Jun. 2016, the entire contents of which being incorporated herein by reference.

BACKGROUND

Field of Disclosure

The present disclosure relates to communications devices which are configured to act as relay devices for transmitting downlink data received from an infrastructure equipment to a remote communications device. The present disclosure also relates to communications devices acting as relay devices for transmitting uplink data received from a remote communications device to an infrastructure equipment of a mobile communications network.

The present disclosure claims the Paris convention priority to European patent application 16176296.8 the contents of which are herein incorporated by reference.

Description of Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present disclosure.

Third and fourth generation wireless communications systems, such as those based on the third generation partnership project (3GPP) defined UMTS and Long Term Evolution (LTE) architecture are able to support sophisticated services such as instant messaging, video calls as well as high speed internet access. For example, with the improved radio interface and enhanced data rates provided by LTE systems, a user is able to enjoy high data rate applications such as mobile video streaming and mobile video conferencing that would previously only have been available via a fixed line data connection. The demand to deploy third and fourth generation networks is therefore strong and the coverage area of these networks, i.e. geographic locations where access to the networks is possible, is expected to increase rapidly. However, whilst fourth generation networks can support communications at high data rate and low latencies from devices such as smart phones and tablet computers, it is expected that future wireless communications networks will need to support communications to and from a much wider range of devices, including reduced complexity devices, machine type communication (MTC) devices, wearable devices, devices which require little or no mobility, high resolution video displays and virtual reality headsets. As such, the supporting of such a wide range of communications devices, and the device-to-device (D2D) communications between them, can represent a technical challenge for a wireless communications network.

A current technical area of interest to those working in the field of wireless and mobile communications is known as "The Internet of Things" or IoT for short. The 3GPP has proposed to develop technologies for supporting narrow band (NB)-IoT using an LTE or 4G wireless access interface and wireless infrastructure. Such IoT devices are expected to be low complexity and inexpensive devices requiring infrequent communication of relatively low bandwidth data. It is also expected that there will be an extremely large number of IoT devices which would need to be supported in a cell of the wireless communications network. Furthermore such NB-IoT devices are likely to be deployed indoors and/or in remote locations making radio communications challenging. There has also been an increased requirement to provide efficient techniques to NB-IoT devices such as wearable devices, which may have only a short range facility for radio communications and so may be configured to transit to and receive from a wireless communications network via a relay node or device. However scheduling the transmission of downlink data, which has been received from a wireless communications network at a communications device acting as a relay device, to a receiving or remote communications device, can represent a technical problem. Likewise scheduling the transmission of uplink data received from remote communications devices at a communications device acting as a relay device to a wireless communications network can represent a technical problem.

SUMMARY OF THE DISCLOSURE

Embodiments of the present technique can be arranged to communicate data from a wireless communications network to a remote communications device via a relay device, which is a communication of downlink data. Embodiments of the present technique can be arranged to provide the relay device with a buffer in which data received from an infrastructure equipment of the wireless communications network is stored in preparation for communication to the remote communications device. The relay device detects that data stored in the buffer should be transmitted to the remote communications device in accordance with predetermined conditions, which may define one or more trigger conditions for transmitting the data from the buffer to the remote communications device.

According to example embodiments of the present technique, a communications device acting as a rely device is configured to transmit a buffer status report message indicating that the buffer is storing data received from the infrastructure equipment for transmission to the remote communications device, when predetermined conditions are satisfied or a trigger event occurs so that the transmission of the data to the remote communications device can make more efficient use of communications resources to transmit the data or the remote communications device receives the data when the remote communications device is in a state in which it should receive the data, for example when not in a reduced power state.

Embodiments of the present technique can also provide a communications device acting as a relay device which is configured to receive uplink data from one or more remote communications devices and to transmit the uplink data to an infrastructure equipment of a wireless communications network. The communications device acting as a relay device is configured to receive from one or more of the remote communications devices a buffer status report indicating an amount of uplink data for transmission from the remote communications device to the infrastructure equipment, to transmit an aggregated buffer status report representing a total of the uplink data for transmission to the infrastructure equipment from the remote communications devices, and to receive in response an allocation of communications resources for one or both of transmitting the uplink data from each of the one or more remote communications devices to the communications device acting as a relay device or transmitting the uplink data received at the communications device acting as a relay device to the infrastructure equipment.

The foregoing paragraphs have been provided by way of general introduction, and are not intended to limit the scope of the following claims The described embodiments, together with further advantages, will be best understood by reference to the following detailed description taken in conjunction with the accompanying drawings.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings wherein like reference numerals designate identical or corresponding parts throughout the several views, and wherein:

FIG. 13 is an example representation of a buffer status report message illustrating a plurality of different buffer sizes corresponding to the data stored in each respective logical channel group of the remote communications devices to different destinations, e.g. to network or to other remote communications devices;

DETAILED DESCRIPTION OF THE EMBODIMENTS

Conventional Communications System and Relay Nodes

Figure 1:
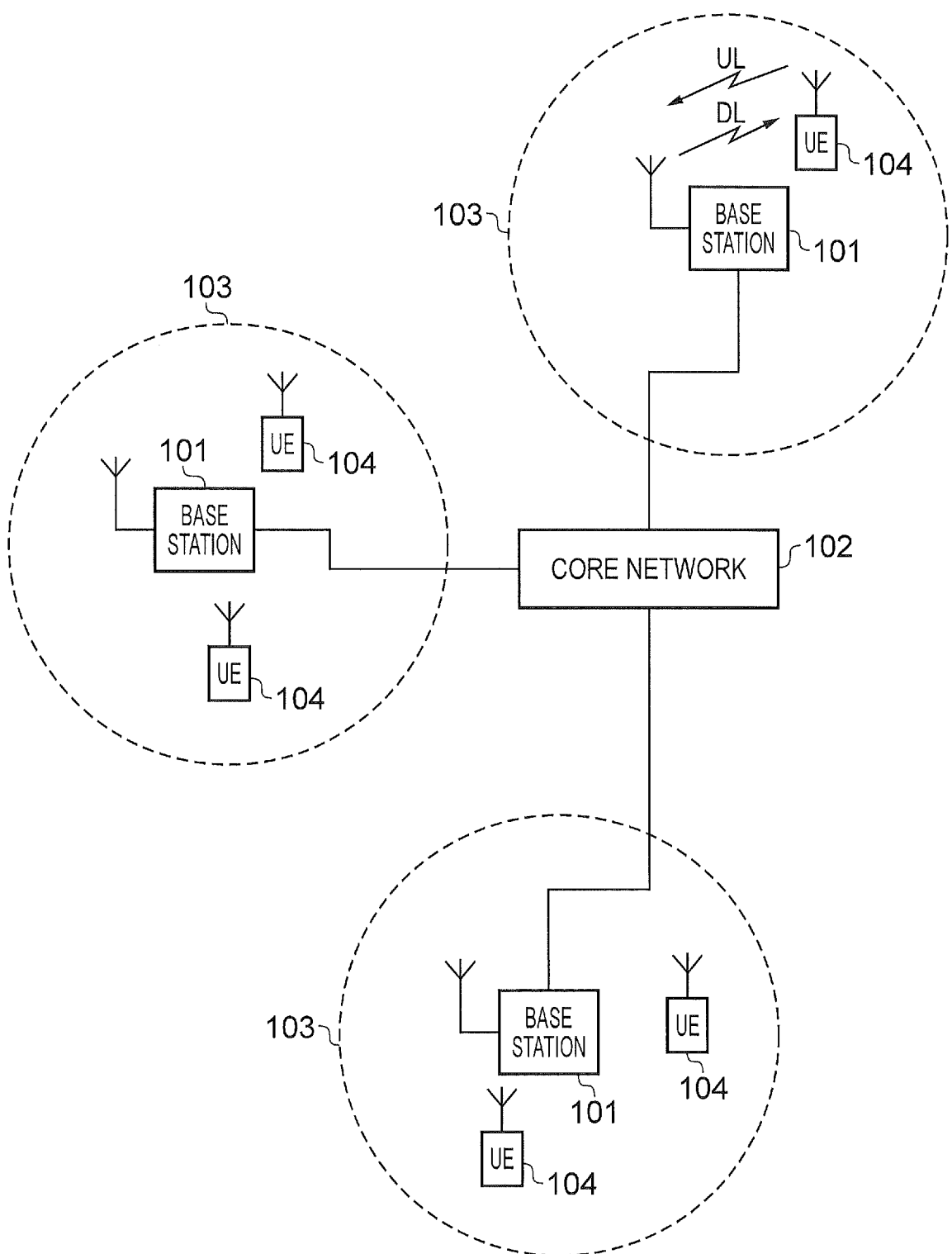
FIG. 1 is a schematic block diagram illustrating an example of a mobile telecommunication system.

FIG. 1 provides a schematic diagram illustrating some basic functionality of a mobile telecommunications network/system operating in accordance with LTE principles and which may be adapted to implement embodiments of the disclosure as described further below. Various elements of FIG. 1 and their respective modes of operation are well-known and defined in the relevant standards administered by the 3GPP (RTM) body, and also described in many books on the subject, for example, Holma H. and Toskala A [1]. It will be appreciated that operational aspects of the telecommunications network which are not specifically described below may be implemented in accordance with any known techniques, for example according to the relevant standards.

The network 100 includes a plurality of base stations 101 connected to a core network 102. Each base station provides a coverage area 103 (i.e. a cell) within which data can be communicated to and from communications devices 104. Data is transmitted from base stations 101 to communications devices 104 within their respective coverage areas 103 via a radio downlink. Data is transmitted from communications devices 104 to the base stations 101 via a radio uplink. The uplink and downlink communications are made using radio resources that are licensed for exclusive use by the operator of the network 100. The core network 102 routes data to and from the communications devices 104 via the respective base stations 101 and provides functions such as authentication, mobility management, charging and so on. Communications devices may also be referred to as mobile stations, user equipment (UE), user device, mobile radio, and so forth. Base stations may also be referred to as transceiver stations/infrastructure equipment/NodeBs/eNodeBs (eNB for short), and so forth.

Wireless communications systems such as those arranged in accordance with the 3GPP defined Long Term Evolution (LTE) architecture use an orthogonal frequency division modulation (OFDM) based interface for the radio downlink (so-called OFDMA) and a single carrier frequency division multiple access scheme (SC-FDMA) on the radio uplink.

Mobile communications networks may further include relay nodes, to try to extend a radio coverage area provided by the network to reach communications devices which would otherwise be out of range of the mobile communications network or to improve the ratio of successful transmissions between a terminal and a base station. Relay nodes further allow power consumption at the terminal to be reduced, as the range of transmission for that terminal will be reduced.

Figure 2:
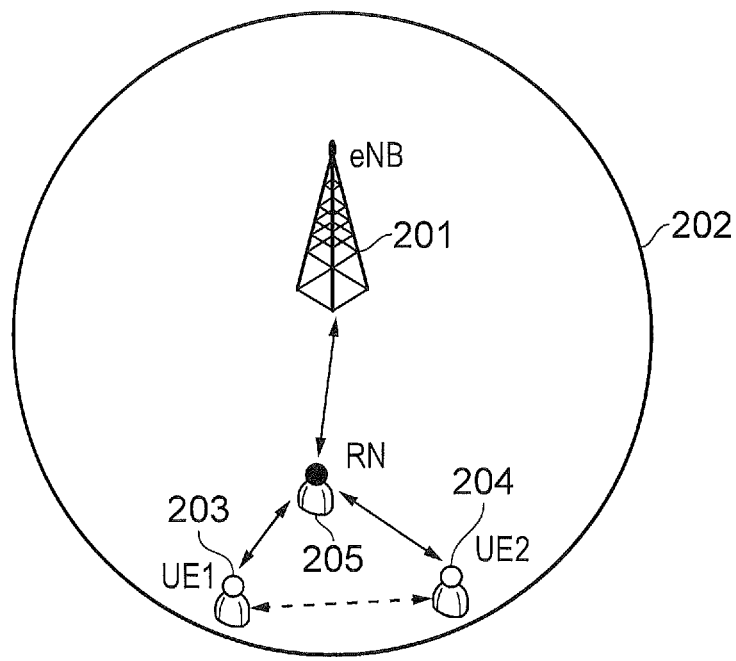
FIG. 2 illustrates an example of D2D communications using a relay node.

FIG. 2 illustrates an example network comprising an eNodeB 201 with a coverage area 202. Two UEs 203 and 204 may communicate with one another using device-to-device (D2D) communications. To communicate with the eNodeB 201, each of the UEs 203 and 204 communicate with a relay node 205, which then relays signals to and from the eNodeB 201. In the example of FIG. 2, both UEs 203 and 204 are inside the coverage area 202 of the eNodeB 201, so signals are not necessarily being relayed for coverage purposes. For example, the UEs 203 and 204 may be low power devices, and so communicating with the relay node 205 consumes less power (as communications are over a shorter range) than communicating directly with the eNodeB 201 would do.

A relay node can generally be defined as a wireless radio access point for relaying transmission and which thus does not implement all of the functionalities of a base station. It is in general not directly connected to the core network but uses wireless access (inband or outband) for backhaul link to connect with a base station.

In other examples, the backhaul link may also be provided over a wired connection. Relay technologies are known generally to provide an arrangement for receiving signals from a base station and for retransmitting the received signals to a UE in a mobile communications network, or to receive signals transmitted from a UE for re-transmission to a base station of a mobile communications network.

Narrowband Internet of Things and Machine Type Communications

In 3GPP a project relating to improvements to LTE wireless access interfaces to provide for a Narrowband Internet of Things (NB-IoT) was agreed [2]. This project is aimed at improved indoor coverage, support for massive number of low throughput devices, low delay sensitivity, ultra-low device cost, low device power consumption and (optimised) network architecture. An example of such a device is a smart meter. It has been proposed that an NB-IoT communications system supports a bandwidth of only 180 kHz and can have three operational modes:
 1. 'Stand-alone operation' utilising for example the spectrum currently being used by GERAN systems as a replacement of one or more GSM carriers
 2. 'Guard band operation' utilising the unused resource blocks within a LTE carrier's guard-band
 3. 'In-band operation' utilising resource blocks within a normal LTE carrier One of the objectives of NB-IoT is to allow the cost of devices to be as low as possible. This is also an objective of Low Complexity Machine Type Communication (LC-MTC). LC-MTC terminal devices (UEs) also implement new LTE features which are currently being specified in 3GPP. The main features of LC-MTC UE are low complexity (and therefore low cost), coverage enhancement and reduced power consumption.

Wearable devices (such as smartwatches and the like) are examples of devices which may make use of NB-IoT or LC-MTC communications systems. In 3GPP Rel. 14 a study item into further enhancements to LTE D2D communications, network relays for IoT and wearable devices has been approved [3], including the enhancement of D2D to be more suitable for lower cost/complexity (e.g. wearable) devices. The first phase of the study will evaluate scenarios and requirements with the intention of refining and updating current objectives. In addition to this, it has been agreed that relay technologies will form part of the future work on new radio access technology (RAT) for fifth generation (5G) wireless communication systems. It is anticipated that enhancements made to LTE D2D will also be applicable to these 5G systems.

Employment of Relay Nodes for Wearable Devices

One of the benefits of connecting indirectly to the network via a relay is that a remote device (e.g. a wearable device such as a smart watch) may reduce its power consumption, since uplink transmissions can be performed at a much shorter range to the relay device, rather than to the eNodeB. One potential realisation of this would be to utilise a narrowband channel similar to eMTC or NB-IoT for the relay link. This would be suitable for sending (and also potentially receiving) small amounts of data via the relay.

Figure 3:
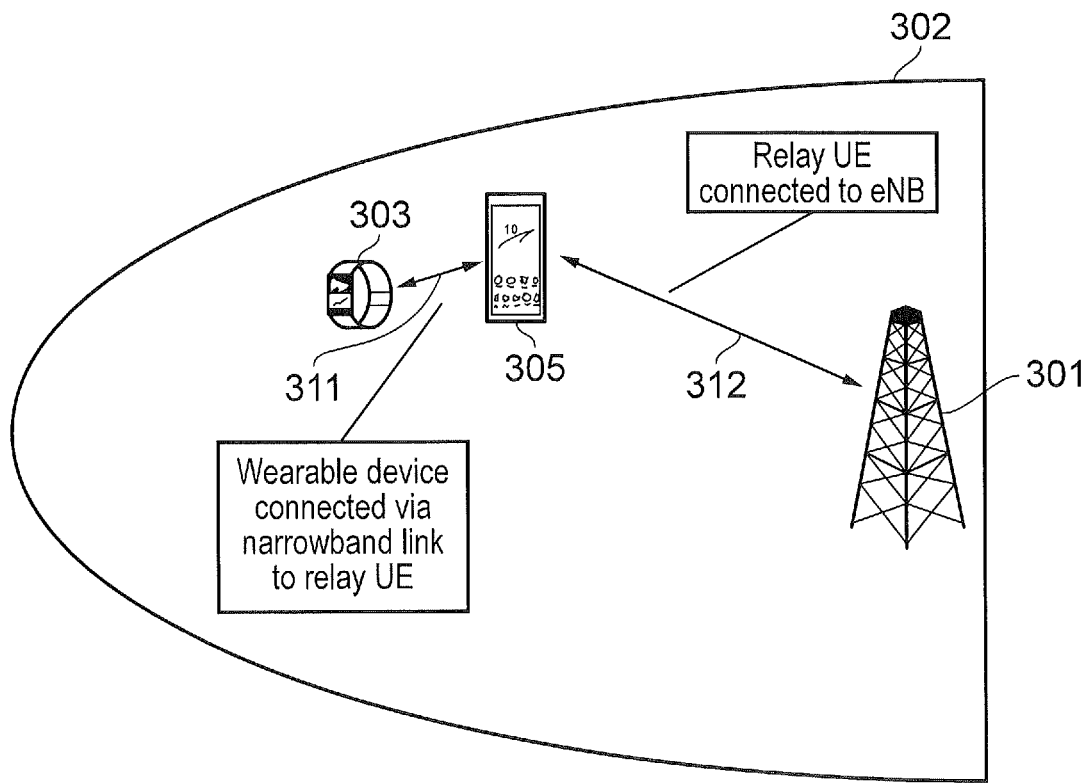
FIG. 3 illustrates an example scenario in which a remote wearable device may communicate with an eNodeB using a communications device as a relay node.

FIG. 3 illustrates an example scenario in which a remote wearable device 303 may communicate with an eNodeB 301 using a communications device 305 as a relay node. The eNodeB 301 has a coverage area 302, which the remote wearable device 303 and communications device 305 are within. The remote wearable device 303 is connected by a narrowband link 311 to the communications device 305, and the communications device is connected by a conventional link 312 to the eNodeB 301. The remote wearable device 303 may be, for example, a smartwatch, while the communications device 305 may be, for example a smartphone. The owner of the smartwatch may also own the smartphone, or alternatively, they may be owned by separate users.

In order to communicate data efficiently, resource allocation can be one of the functionalities which can be enhanced on the relay device. In order for the effective resource allocation to be performed, both on the access link of remote UE-relay UE and on the backhaul link of relay UE-serving eNodeB, the buffer status reporting that provides the information about the amount of data which is to be transmitted to the remote UE from a buffer in the relay UE may play an import role in the resource allocation decision procedure.

Downlink Data Communication Using Buffer Status Reports from Relay to UE

Embodiments of the present technique can be arranged to communicate data from a mobile communications network to a receiving device via a relay device, which is a communication of downlink data. Embodiments of the present technique are arranged to provide a relay device with a buffer in which data received from the communications network such as from an eNodeB is stored in preparation for communication to a receiving or remote UE. The relay device detects that data stored in the buffer should be transmitted to the remote UE in accordance with predetermined conditions, which may define one or more trigger conditions for transmitting the data from the buffer to the remote UE. For example, the data may be non-delay tolerant or delay sensitive and therefore should be transmitted as soon as possible and without delay. In contrast if the data is delay tolerant then in order to improve an efficiency with which the data is communicated to the remote UE, a timer may be started to monitor a predetermined period in which more data may be received on the downlink from the eNodeB for communication to the remote UE. As will be appreciated in order to make a most efficient communication of data with respect to overheads required for control messages (or access stratum messages), increasing an amount of data which can be communicated in a communications session with respect to control messages, which are necessarily communicated to establish the communications session, the greater the efficiency with which communications resources are used to communicate the data. Accordingly, at the expiring of the timer monitoring a predetermined time, the relay device transmits a buffer status report message to the remote UE indicating that the relay device has data for transmission to the remote UE. In response to receiving the buffer status report message, the remote UE transmits a scheduling request message to the relay device requesting resources for receiving the data from the relay device. For example, the remote UE may have established a D2D side link communications interface with the relay device. Since the relay device is to transmit the data, then the relay device is responsible for indicating the resources within which the data is to be transmitted. In response, the relay device transmits a message indicating an allocation of communications resources for the remote UE to receive the data and then transmits the data from the buffer to the remote UE.

Embodiments of the present technique therefore address a technical problem of improving resource allocation by indicating to a remote UE that data has been received at the relay device for transmission to the remote UE and balancing service requirements with respect to the remote UE's availability. Accordingly buffer status reports (BSR) are transmitted by the relay node or device to the remote UE for notifying the remote UE of the arrival of data at the relay device. According to the characteristics of the buffered data, the relay node may wait for the response from UE or send the data with minimal delay. Therefore generally:

The relay device transmits a buffer status report message to the remote UE to indicate the arrival of data.

The remote UE will decide to send scheduling request or not according to its local conditions.

The relay device may decide how to process the buffered data according to the feedback from UE as well as service characteristics.

In some examples therefore, the remote UE may wait to transmit the scheduling request message to the relay device subject to predetermined conditions such as for example that the remote UE has a minimum power level available, for example when battery powered, or the radio communications conditions are sufficient to meet a minimum quality level or that a timer has expired since receiving the buffer status report message. A remote UE may also have a timer and may wait a predetermined time before transmitting the scheduling request message, because the remote UE may be in a power save mode or in order to ensure that the relay device has acquired a sufficient amount of data for transmission to the communications device.

Figure 4:
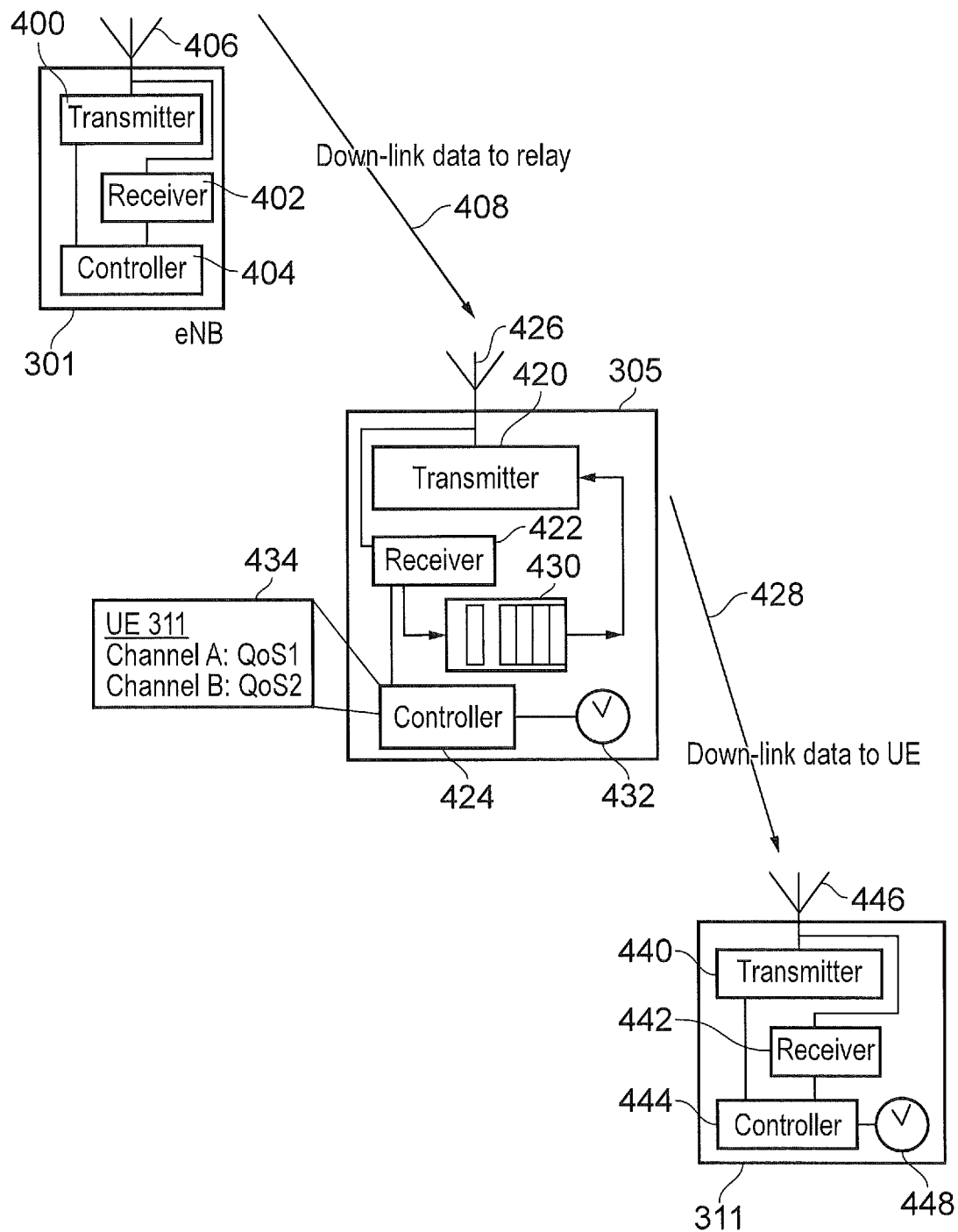
FIG. 4 is a part schematic representation, part message flow diagram illustrating the communication of downlink data from an infrastructure equipment (eNB) of a wireless communications network to a remote communications device (UE) using a communications device (UE) acting as a relay device in accordance with embodiments of the present disclosure.

FIG. 4 provides a schematic block diagram illustrating example embodiments of the eNodeB 301, the communications device acting as a relay device 305 and the remote UE 303 in more detail. As shown in FIG. 4 the eNodeB 301 comprises a transmitter 400, a receiver 402 and a controller 404. The eNodeB transmits and receives signals under control of the controller via an antenna 406. As represented by an arrow 408 the eNodeB 301 transmits downlink data for the remote UE 311 via the relay device 305.

The relay device 305 may be a conventional communications device (UE) which acts as a relay node or it may be a dedicated relay device. Accordingly, in the following description the communications device 305 acting as a relay device will be simply referred to as a relay device.

As shown in FIG. 4 the relay device 305 comprises a transmitter 420, a receiver 422 and a controller 424. The controller 424 controls the transmitter 420 and the receiver 422 to transmit and receive signals via an antenna 426. As will be explained in the following paragraphs the relay device 305 transmits data received from the eNodeB 301 on the downlink (or sidelink if the interface between the relay device 305 and a remote UE 311 is a PC5 or D2D type interface) which is represented by an arrow 428. Also shown within the relay device 305 is a buffer 430 and a timing device or clock 432. Data blocks or units received on the downlink from the eNodeB 301, for example in each transmission time interval (TTI) are stored under the control of the controller 424 and the receiver 422 in the buffer 430 for communication to the remote UE 311. The data units are stored in the buffer and transmitted from the buffer 430 using the transmitter 420 as represented by the arrow 428. However as will be explained in the following paragraphs the transmission of the data from the buffer 430 by the transmitter 420 to the remote UE 311 may depend on the predetermined conditions or trigger events. For example data to be transmitted to the remote UE may be in accordance with a quality of service (QoS) established between the eNodeB and the relay device 305 which indicated that the data may or may not be delay tolerant. According to this QoS therefore the data in the data buffer 430 may be delayed for a predetermined period which is monitored by the clock 432 under the control of the controller 424 so that more data can be received on the downlink and stored in the buffer for transmission to the receiving device 311. As mentioned above, by receiving more data within the buffer 430 before establishing the communications between the relay device 305 and the remote UE 311 a more efficient communication of data can be received with respect to signalling messages which are required to established the communications resources in which the data is transmitted and from which the remote UE 311 is to receive the data. For this reason the controller 424 may include an indication of a quality of service for one or more data channels represented as channel A and channel B each being established with a particular quality of service QoS1, QoS2 for the UE 311 as represented within a box 434.

The remote UE 311 shown in FIG. 4 also comprises a transmitter 440, a receiver 442 and a controller 444. The controller 444 controls the transmitter and the receiver to transmit and receive signals via an antenna 446 in order to establish the communications resources on which the data is received from the relay device 305 on the downlink as represented by the arrow 428. The remote UE 311 may also include a timer clock 448 which subject to a delay tolerance of the data being received may be used to delay receiving the data from the relay device 302. As such, the establishment of a communications resources for receiving the downlink data from the relay device may be delayed until the timer clock 448 has expired after a predetermined time such as for example to monitor a power saving mode in order to conserve power. Alternatively this can also be used to ensure that there is sufficient data in the buffer 430 of the relay device 305 to make the transmission of the downlink data efficient with respect to signalling messages which must be exchanged between the relay device 305 and the remote UE 311.

Figure 5:
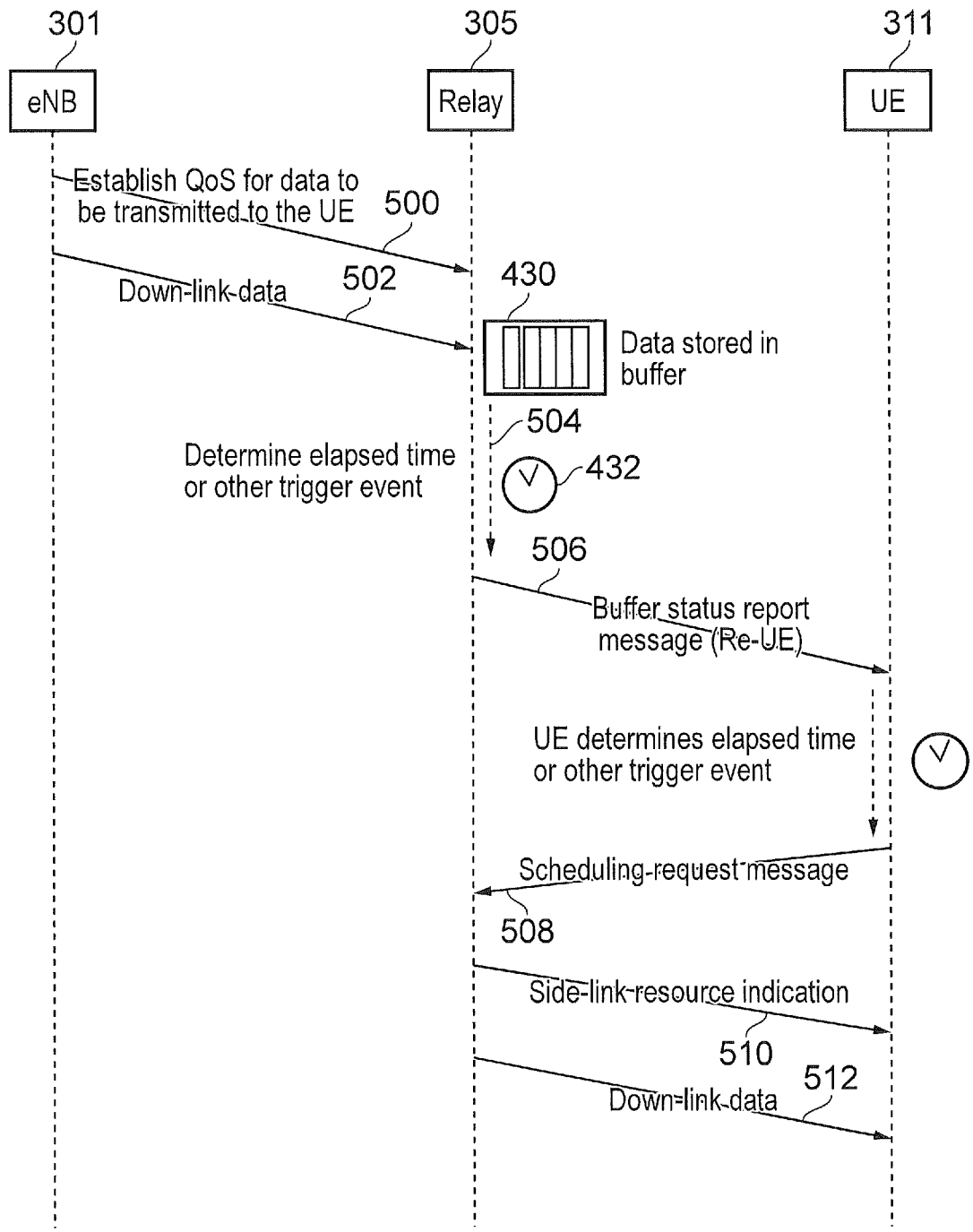
FIG. 5 illustrates a message flow diagram between an infrastructure equipment, a communications device acting as a relay device and a remote communications device to schedule the transmission of downlink data in accordance with embodiments of the present disclosure.

FIG. 5 provides a message flow diagram representing a process in which data is transmitted on the downlink from the eNodeB 301 to the remote UE 311 via the relay device 305 in accordance with an embodiment to the present technique. As shown by a first arrow 500, as a first preliminary step the eNodeB 301 may establish with the relay device 302 a quality of service (Qos), which is to be observed for the transmission of data to the remote UE 311. The eNodeB 301 then transmits data on the downlink to the receiving device 305, as represented by an arrow 502. As indicated above, the data is then stored within a data buffer 430 within the relay device 305. The relay device 305 then determines whether it should transmit the data from the data buffer 430 to the remote UE 311, according to predetermined conditions defining trigger events. As mentioned above with reference to FIG. 4 and illustrated in FIG. 5, one of the predetermined conditions could be whether a time has elapsed since data has been received within the data buffer 430 for transmission from the remote UE 311. Therefore, as represented by the clock 432, the controller 424, within the relay device 305, monitors a time since the first data item or block has been received which is to be transmitted to the remote UE 311 as represented by a dashed line. As indicated above, by waiting for this predetermined time, a more efficient transmission of the data can be achieved from the buffer 430 to the remote UE 311. The relay device 305 then transmits a buffer status report message after a predetermined time as elapsed or another trigger event has occurred, such as the receipt of a non-delay tolerant data block as represented by an arrow 506. The buffer status report message 506 is therefore transmitted from the UE device 305 to the remote UE 311.

The remote UE 311 may then transmit a scheduling request message represented by an arrow 508 to the relay device 305 scheduling the allocation of resources or requesting an indication of available communications resources for receiving the data from the relay device transmitted from the data buffer 430 to the UE 311. Performing scheduling request message therefore depends on the interface between the relay device 305 and the UE 311. So that the scheduling request message may be a D2D type request message.

The scheduling request message 508 may only be transmitted by the UE 311 after predetermined conditions have been satisfied such as the UE 311 has sufficient power if for example it is battery powered or the radio communication conditions between the UE 311 and the relay device 305, satisfy predetermined conditions or a sufficient time has elapsed since the receipt of the buffer status report message. Thus, the controller 404 within the remote UE 311 may start a timer after receiving the status report message, or alternatively the timer may already been running as a result of another event such as the UE 311 entering a power saving mode. The timer can also be used to monitor a predetermined time since receiving the buffer status report message before the scheduling request message 508 is transmitted. The predetermined time may be required by the UE 311 to conserve power since a previous reception or to ensure that there is sufficient data within the data buffer 430 to make the transmission of the data efficient with respect to the control messages being transmitted or for ensuring that the remote UE does not compete with other UEs being served by relay device 305. In another example the remote UE 311 may not transmit the scheduling request message based on a user's status, for example if the user is driving a car.

As shown in FIG. 5, after transmitting the scheduling request message 508 which is received by the relay device 305, the relay device 305 transmits a side link resource indication message represented by an arrow 510 to the remote UE 311 providing an indication of the resources of the side link wireless access interface which are to be used by the relay device 305 to transmit the data to the UE 311 from the buffer 430. Finally, as represented by an arrow 512 the data is transmitted by the relay device 305 to the remote UE 311.

In some examples the buffer status report message 506 may include an indication of a maximum allowed delay (e.g.1 hour) for which the relay device 305 may store the data. Therefore when the eNodeB sends delay-sensitive data to the remote UE via the relay device or the timer of maximum delay has expired at the relay device, then the relay device procedures to schedule the transmission of the downlink data from the buffer to the remote UE.

Summary of Downlink Operation Having regard to the above described embodiments, the following general steps may be performed:
1. Establishment
   a. eNodeB configures the relay (and UEs) with QoS requirement (e.g. delay tolerant or not)
   b. Relay establishes a PC5 connection to the remote UE
2. Data arrival at the Relay device from eNodeB
   a. eNodeB sends the downlink data to relay device
      i. if the QoS of the data is delay tolerant, the relay device stores the data in the buffer and starts the timer
      ii. If the QoS of the data is non-delay tolerant, the relay proceeds to schedule the transmission of the received data to the remote UE.
   b. If additional data arrives, and
      i. if the buffer has room to store that data, the relay device stores the data in the buffer
      ii. If not, the relay device proceeds to schedule the transmission of the data to the remote UE.
   c. The relay device then transmits a downlink buffer status report to the remote UE.
3. Action by the remote UE in response to the buffer status report message:
   a. If the remote UE is in a power saving state, the UE receives the buffer status report message but does not retrieve the data.
   b. If the remote UE is in a power active state, then the remote UE proceeds to prepare to receive the downlink data.
4. When remote UE enters an active state (for example, when the user checks the time with a wearable watch, the wearable UE changes the power saving state)
   a. After the UE has received the buffer status report message, the remote UE sends a downlink scheduling request (DLSR) to the relay device for retrieving the downlink data in the buffer of relay
5. Timer expired
   a. When the timer is expired,
      i. UE initiated example (timer of UE is expired)
         1. The remote UE wakes up and enter an active state.
         2. UE sends the scheduling request to the relay device Then the relay device sends the data to UE.
      ii. Relay initiated example (timer of relay is expired)
         1. The relay device send the paging message to UE.
         2. The remote UE wakes up and enter an active state.
         3. Then the relay device schedule(send) the data to UE A summary of signalling parameters and resources which may be provided to implement an embodiment of the present technique are:

Relay device buffer status information (from relay to UE) includes
  UE-ID
  The data size in the buffer
  Remaining timer value (optional)
Buffer status report timer (internal timer in relay and UE respectively)
  Bearer ID
  Timer value
Scheduling report message includes
  UE-ID
  Or reuse of random access instead of scheduling request.

Figure 6:
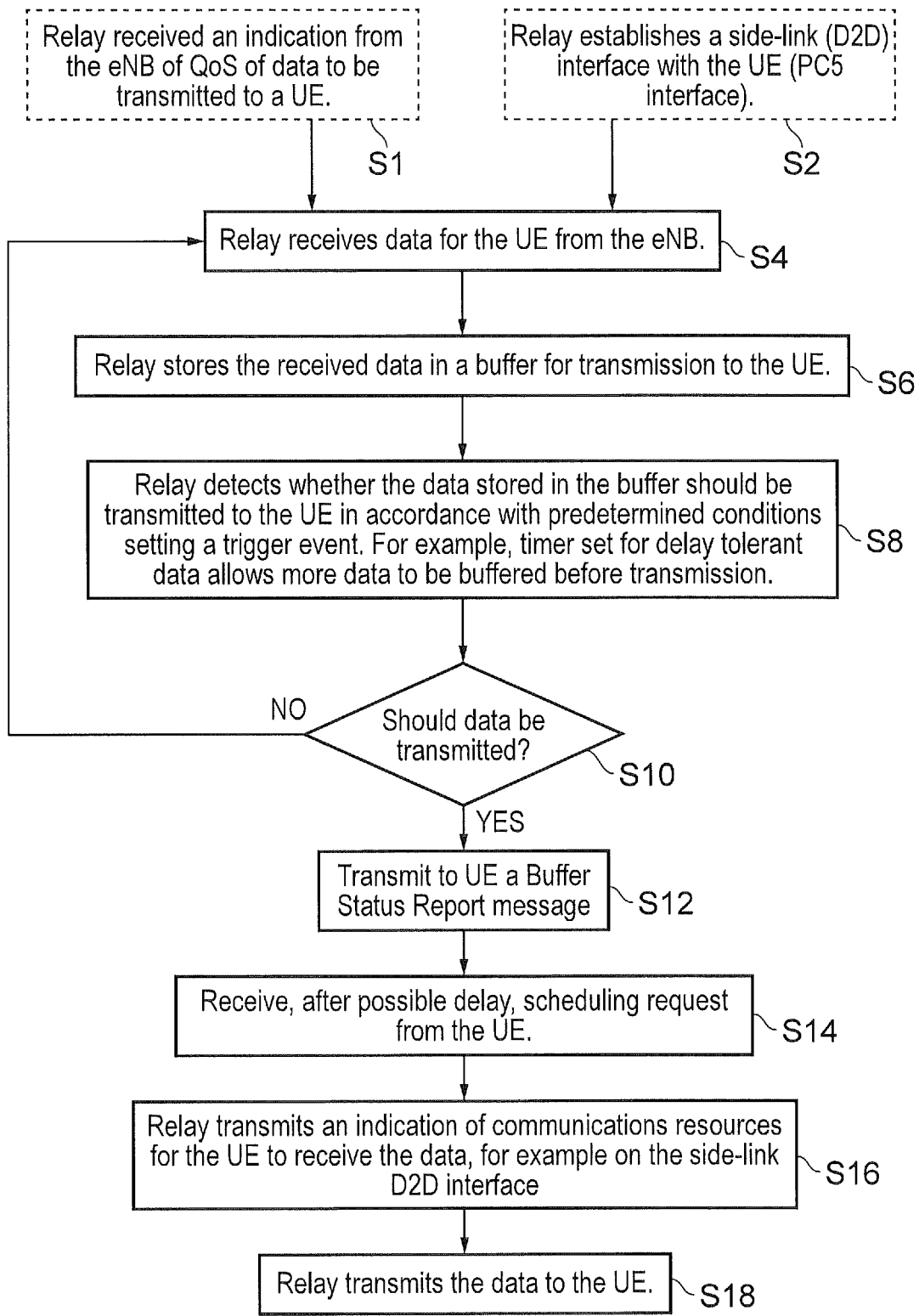
FIG. 6 shows a flow diagram illustrating a process of communicating downlink data from an infrastructure equipment to a remote communications device via a communications device acting as a relay device in accordance with embodiments of the present disclosure.

An example operation of a relay device according to embodiments of the present technique is summarised with a flow diagram shown in FIG. 6. FIG. 6 is summarised as follows:

S1: The relay device receives an indication following establishment of a communications channel with the remote UE of a quality of service of data which is transmitted to the remote UE.

S2: Also optionally at some previous time or following receipt of data from the eNodeB for the remote UE, the relay establishes a side link or D2D type communications with the remote UE.

S4: The relay device only receives data for transmission to the remote UE from the eNodeB. However, after step S6 the relay device stores the received data in a buffer for transmission to the remote UE.

The relay device then detects whether the data stored in the data buffer should be transmitted to the remote UE. This is determined in accordance with predetermined conditions which may define one or more trigger events. For example, depending on the quality of service the data may or not be delay tolerant. If the quality of service of the data is delay tolerant then the relay device stores the data in the buffer then starts a timer.

S10: At decision point S10, the relay device determines whether or not the data should be transmitted to the remote UE. For example, this may be because the timer has expired. If the answer is no, then more data is received for the remote UE and so processing passes to Step S4. If data is received then it is stored in the data buffer for transmission to the remote UE. If, however, the buffer exceeds a predetermined amount, such as if the buffer is full for example, then the relay device determines immediately that it should transmit the data to the remote UE.

S12: If the data is to be transmitted from the buffer of the relay device to the remote UE then the relay device transmits a buffer status report message to the remote UE.

S14: The UE then receives the buffer status report message. However, if the UE is in a power saving mode the UE may receive a buffer status report message but determines that the power saving mode can continue for a predetermined time and therefore does not immediately retrieve the data from the relay device. If however, the UE is in a power active mode then the UE determines that it should receive the data on the down link. In which case, the UE becomes active.

S15: The UE then transmits after a possible delay for the reasons mentioned above a scheduling request message which is then received by the relay device.

S16: The relay device then transmits an indication of communication resources for the remote UE to receive the data for example on the side link of a PC5 interface.

S18: The relay device then transmits the data to the remote UE.

Uplink Data Communication Using Buffer Status Reports from Remote UE to Relay

Example embodiments of the present technique can provide an arrangement for communicating data from a remote UE to an eNodeB via a relay device via a sidelink, which is a communications interface established for a device to device communications. To this end, buffer status reports can be communicated to an eNodeB from the remote UE so that the eNodeB can allocate communications resources. However, in some examples the relay device may allocate communications resources of the sidelink, based on buffer status reports from the remote UEs. Furthermore it is envisaged in the future that UE-to-UE relay techniques may be employed so that a communications device (UE) may act as a relay device, so that it is desirable to provide some arrangement for efficiently and effectively communicating from a remote UE to another UE(s) viaa relay device. Therefore, buffer status reports for communicating data from UE-to-UE as well as a UE to an eNodeB of a wireless communications network should be provided. Furthermore a relay device may be activated on an ad hoc basis or deactivated, so that a remote UE may or may not be connected to a relay device, but may instead communicate data according to a conventional arrangement to the eNodeB, depending on whether it is more efficient to use indirect or direct communication of data to the eNodeB.

Accordingly, embodiments of the present technique can provide an arrangement in which buffer status reports from a plurality of UEs are aggregated and reported to an eNodeB for scheduling sidelink communications resources or determining relay activation and connection status. As such, embodiments of the present technique can provide:

An aggregation of buffer status reports from multiple remote UEs at relay UE.
  The relay UE reports a single aggregated buffer status report to the eNodeB which can be used for determining resource pool assigned to the relay UE for communicating with remote UEs.
  A buffer status report representing data to be transmitted from the buffer of the relay UE may also be transmitted to the eNodeB.
  The buffer status report may be used for relay deactivation condition or disconnecting UE(s)
An aggregation of buffer status reports from multiple remote UEs can be used by the eNodeB
  to determine whether to activate a relay device.
  to determine whether to connect one or more remote UEs to a relay device.

Figure 7:
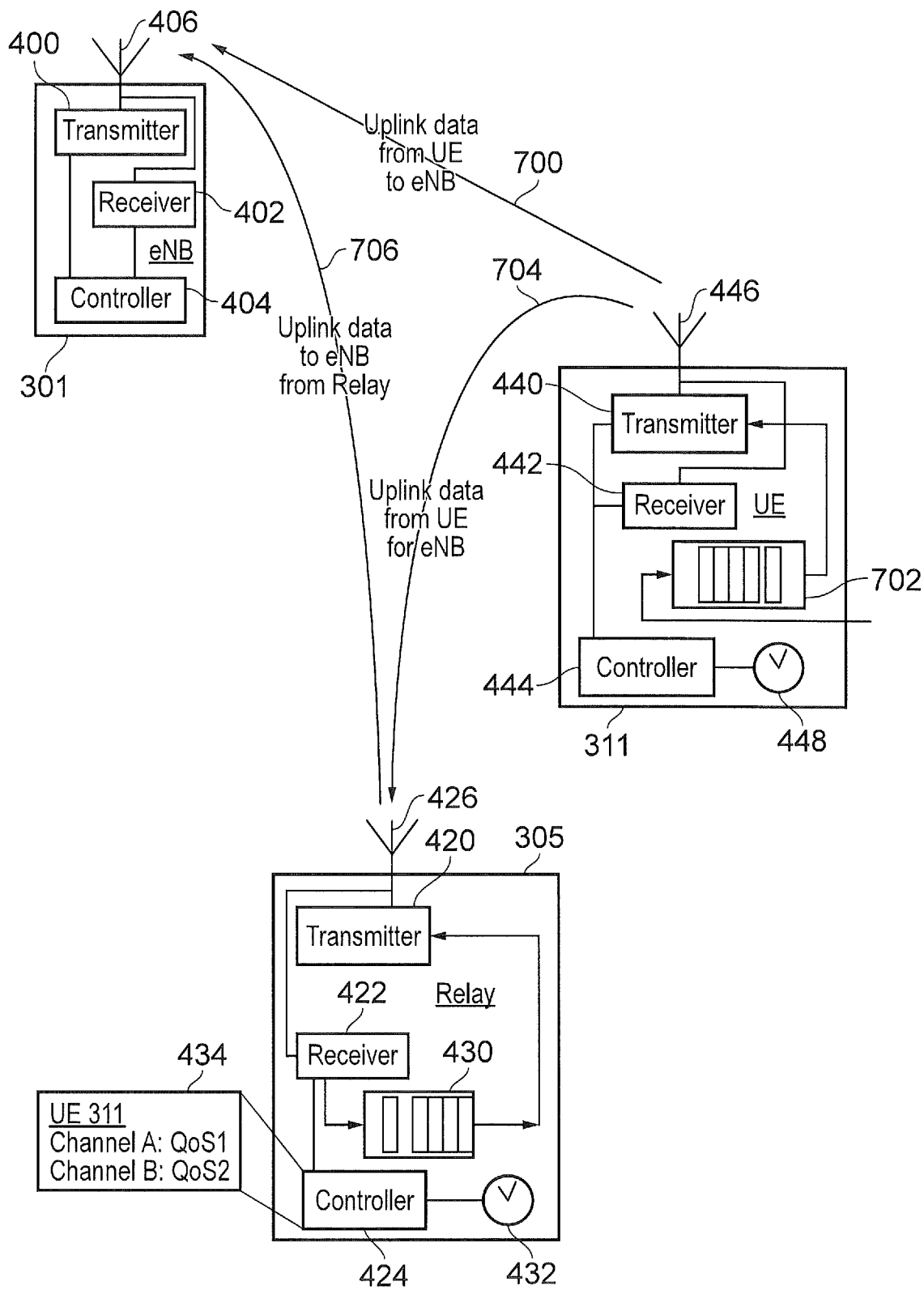
FIG. 7 is an example block diagram and schematic representation illustrating an arrangement for transmission of uplink data from a remote communications device to an infrastructure equipment of a communications network and via a relay device.

FIG. 7 illustrates an arrangement in which uplink data is to be transmitted from a remote UE 311 to an eNB 301 on an uplink. As for the downlink example embodiment, the remote UE 311 may transmit the data via a relay node or a UE acting as a relay node 305. As represented by an arrow 700, according to a conventional operation, data is transmitted on the uplink from the remote UE 311 to the eNodeB 301 in accordance with a protocol in which the remote UE 311 informs the eNodeB 301 of a status of a buffer 702, in which data has been received for the UE 311 to transmit to the eNodeB 301.

Embodiments of the present technique can provide an arrangement in which communications resources of a side link between remote UE 311 and a UE acting as a relay node 424 are allocated for communicating uplink data from the remote UE 311 to the relay 424 for communication on to the eNodeB 301. As shown generally by an arrow 704 data is transmitted on the sidelink from the remote UE to the relay node or device 305 which is then received by the relay node 305 and stored within a receiver buffer 430. The relay device 305 then transmits the data from the relay buffer 430 to the eNodeB 301. In one example, in accordance with an arrangement which reflects the transmission of data from the remote UE 311 to the relay 305 in which the remote UE 311 reports a status of its buffer 702, the relay device 305 also transmits a buffer status report of its data buffer 430 to the eNodeB which triggers the transmission of the data from the receive buffer 430 to the eNodeB 301.

As explained above with reference to the downlink, a corresponding arrangement can be provided for uplink communication in which data is stored in the buffer 702 of the remote UE 311 for a predetermined time or until a trigger event occurs before transmission of the data from the remote UE 311 to the relay device 305. Correspondingly data can be held within the buffer 430 of the relay device 305 for a predetermined time or until a trigger event before transmission of the data on the uplink to the eNodeB as represented by an arrow 706. Accordingly, the same advantages are provided on the uplink as have been explained for the downlink with reference to the example embodiments disclosed in FIGS. 4, 5 and 6. Accordingly, data is collected in the respective buffers 702, 430 of the remote UE 311 and the relay device 305 before being transmitted via the side link and the uplink of the wireless access interface in order to improve an efficiency with which the data is communicated with respect to control channel messages required to established the communications resources of the sidelink and the uplink of the wireless access interface.

Figure 8:
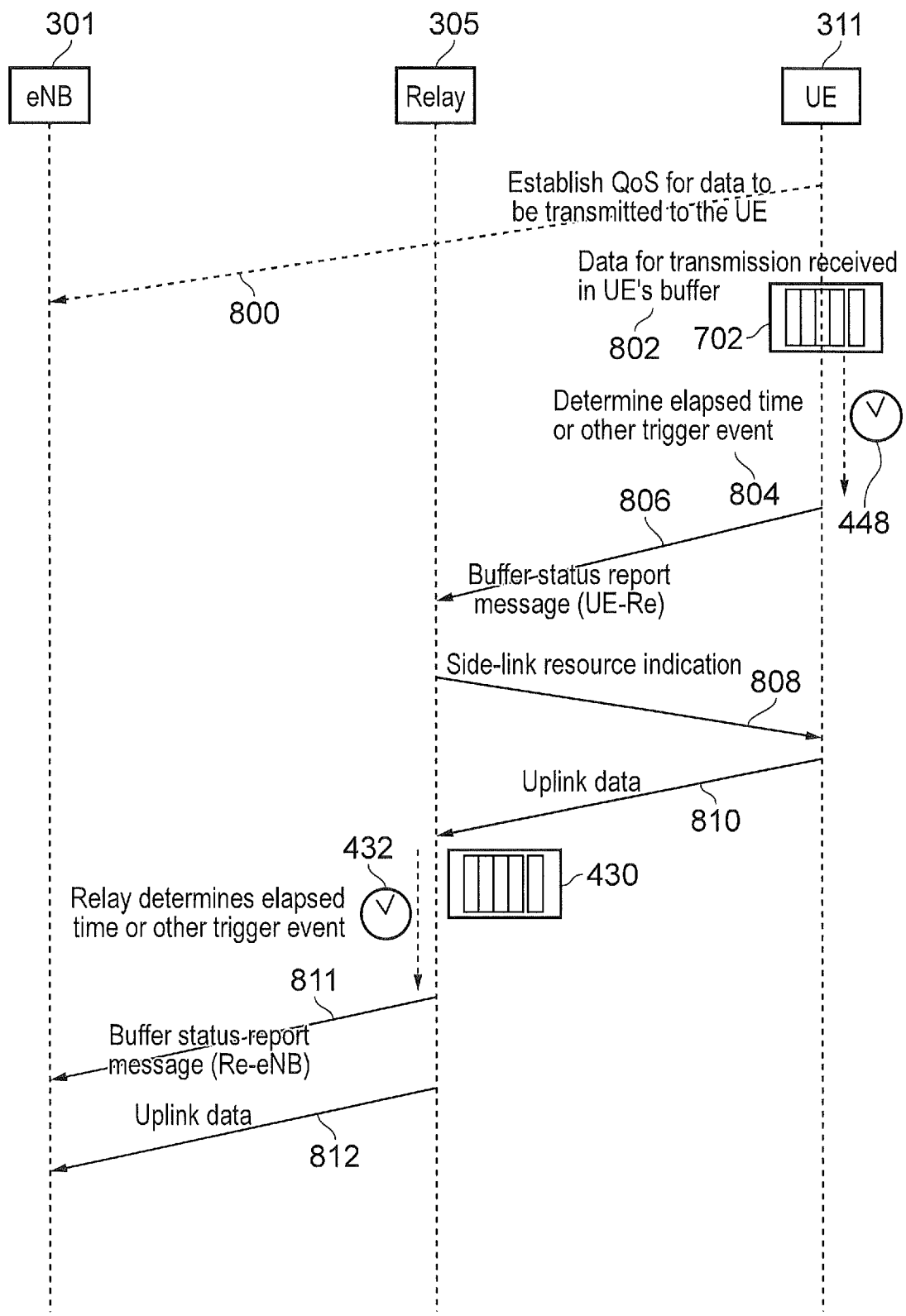
FIG. 8 is an example message flow diagram illustrating a sequence of messages transmitted between a remote communications device, a relay device and an infrastructure equipment of the mobile communications network for uplink data transmission from the remote communications device to the infrastructure equipment.

FIG. 8 provides a message flow diagram illustrating an example embodiment of the present technique in which data is transmitted from the remote UE 311 to the eNodeB 301 via a relay device 305. As represented by a first dashed line arrow 800 the UE 311 in combination with the eNodeB 311 establishes a quality of service for data to be communicated via a channel from the UE 311 to the eNodeB 301 and then on via the wireless access communications network. The quality of service as explained above therefore establishes whether the data transmitted on the uplink from the UE 311 to the eNodeB 301 is delay tolerant or non delay tolerant.

As shown in the first step 802, data is received by the remote UE 311 and stored in its received data buffer 702 for transmission to the eNodeB via the relay device 305. As for the previous example of the downlink, the UE 311 may use its clock 448 to monitor a predetermined time within which more data may be collected in the data buffer 702 before the data is transmitted to the relay device 305. Alternatively, another trigger event may occur such as a data packet which is non delay tolerant is received within the receive buffer 702 of the UE 311.

As represented by an arrow 806 the UE 311 then transmits a buffer status report message to the relay device 305 indicating a status of its buffer and that data should be transmitted to the relay device 305. In response the relay device 305 provides an allocation of resources to the UE 311 as represented by an arrow 808. The remote UE 311 then transmits the data to the relay device 305 from the data buffer 702 to a relay device 305 which is received within the receive buffer 430. According to an example embodiment of the present technique, the relay device 305 may store data within its receive buffer 430 from the remote UE 311 for a predetermined time or until a trigger event occurs in order to make efficient use of the communications resources, in a corresponding way as explained above for the downlink. Finally, the relay device 305 transmits a buffer status report message 811 to the eNodeB 301, reporting its buffered data amount. The eNodeB responds by allocating communications resources, and as represented by an arrow 812 the data is transmitted from the receive buffer 430 of the relay device 305 to the eNodeB 301 in the allocated communications resources.

As will be appreciated from the above explanation, allocation of communications resources to a device acting as a relay node in order to make effective and efficient use of those communications resources for transmission of data from a remote UE to an eNodeB presents a technical problem. To this end, the reporting of buffer status report messages from the remote UE 311 to the device 305 and correspondingly from the relay device 305 to the eNodeB 301 can be significant for efficiently communicating data.

Embodiments of the present technique can provide an arrangement in which a communications device acting as a relay device or node is configured to receive a buffer status report message from each of a plurality of remote UEs. The relay device combines the buffer status report messages to form an aggregated buffer status report message indicating a total amount of side link resources which are required in order to communicate data from each of the remote UE's receive data buffers to the relay device before transmission of the data on the uplink from the UE to the eNodeB 301. An example embodiment is illustrated in a diagram shown in FIG. 9. Corresponding features shown in FIG. 9 which are the same as those in FIGS. 4 and 7 have the same numerical reference numerals.

Figure 9:
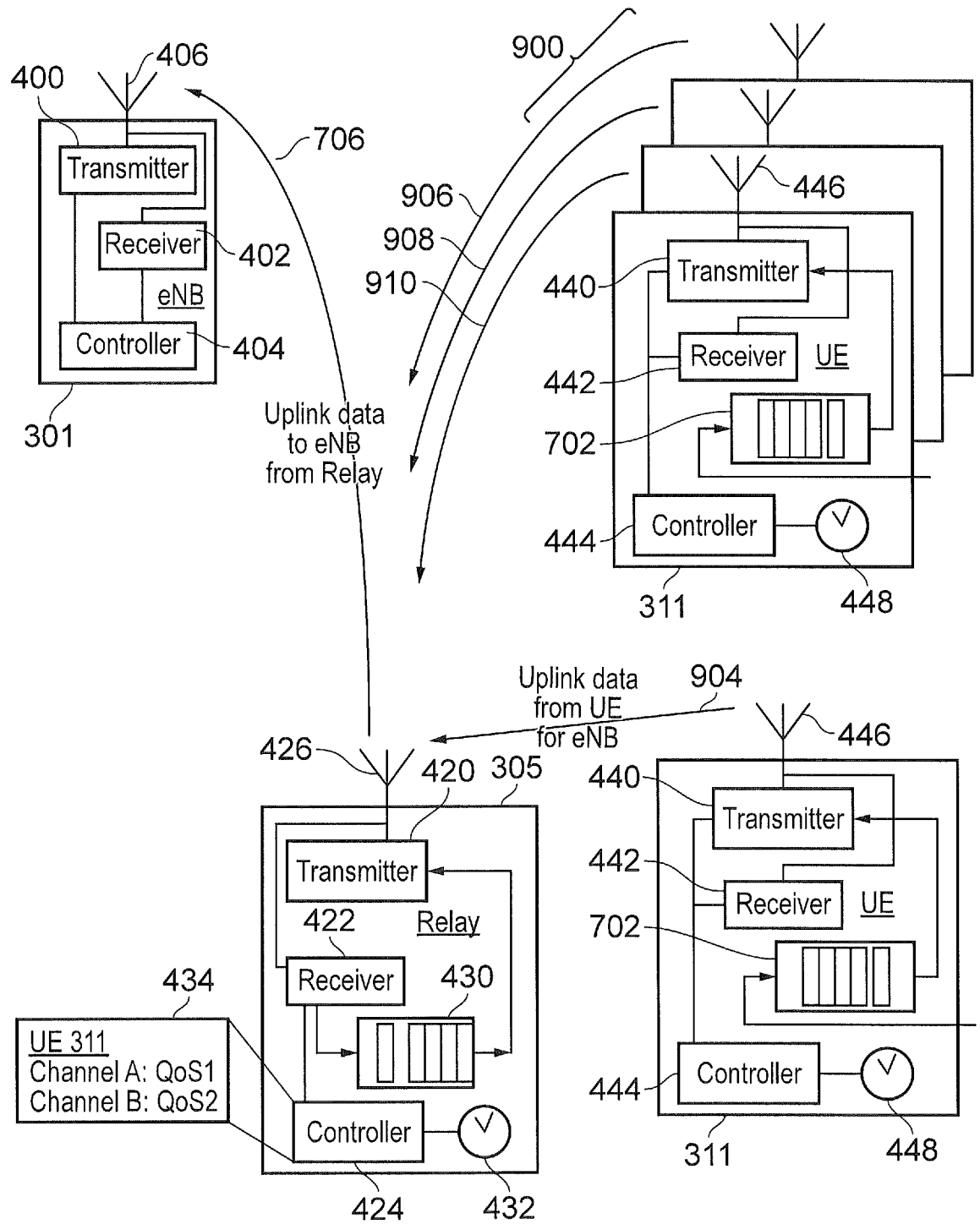
FIG. 9 is a schematic block diagram of a plurality of remote communications devices, a relay device and an infrastructure equipment in which the relay device is configured to relay uplink from the plurality of remote communications devices to the infrastructure equipment in accordance with the present technique.

As showing in FIG. 9, in contrast to the example shown in FIG. 7, and in addition to the remote UE 311, there is also shown a plurality of other remote UE's 900 each of which includes the same features as the first remote UE 311 as described above. However in accordance with a process explained above with respect to the first UE 311 transmitting uplink data for the eNodeB on the sidelink to the relay device 305, each of the other UE's 900 transmits a buffer status report 904, 906, 908, 910 to the relay device 305. In accordance with an embodiment of the present technique the relay device 305 receives each of the buffer status report messages from each of the remote UE's 311, 900. The controller 424 then forms an aggregated representation of an amount of data in all of the buffers of the remote UE's 311, 900. The controller 424 then combines the aggregated data from all of the buffers of the remote UE's 311, 900 and transmits an aggregated buffer status report using the transmitter 420 to the eNodeB 301.

In accordance with example embodiments of the present technique, the eNodeB 301 is responsible for allocating communications resources for communicating data on the uplink, that is from the relay device 305 to the eNB 301 and also the sidelink, that is between the relay device 305 and the remote UEs 311, 900. For example the eNodeB 301 may allocate resources in the form of a resource pool, and the relay device may than select resources for relay device-remote UE communication from this allocated resource pool. Accordingly the controller 404 within the eNodeB 301 receives the aggregated buffer status reports using the receiver 402 and analyses the buffer status reports aggregated for all of the remote UE 311, 900 in order to identify communications resources which are required for communicating the data from remote UEs 311, 900 on the sidelink to the relay device 305. Accordingly the controller 404 of the eNodeB 301 can allocate communications resources to the relay device 305 for allocation by the relay device 305 to the remote UEs 311, 900 for the communication of the uplink data from the buffers 702 of each of the remote UEs 311, 900 to the relay device 305.

Figure 10:
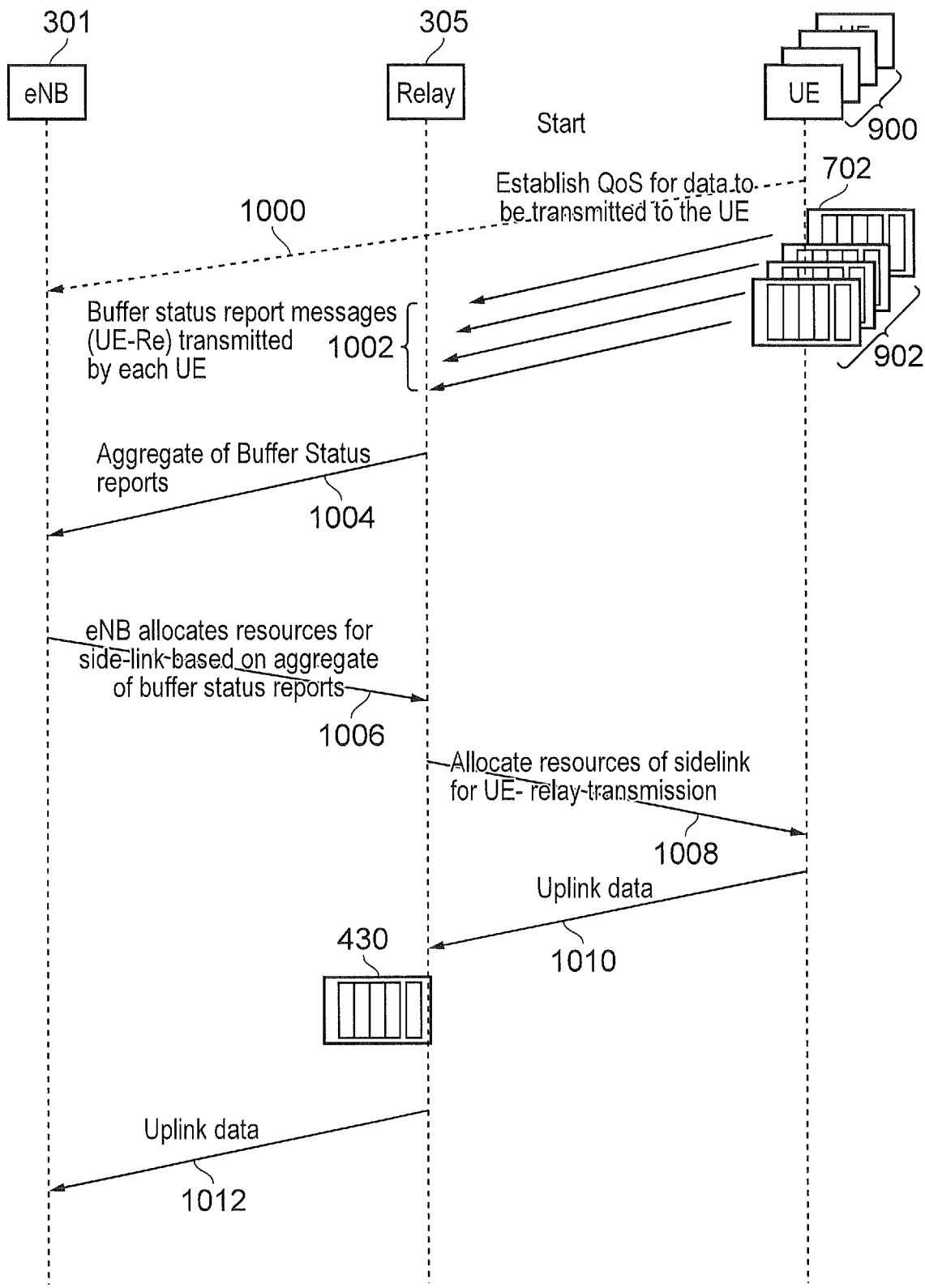
FIG. 10 is a message flow diagram illustrating the transmission of uplink data from remote communications devices via a relay device to an infrastructure equipment of a mobile communications network corresponding to the example illustrated in FIG. 9.

A message flow diagram illustrating an example embodiment of the present technique is shown in FIG. 10. As shown in FIG. 10, which provides a message flow diagram corresponding to those shown in FIGS. 5 and 8, in a first step represented by a dashed arrow 1000, each of the remote UE's 311, 900 establishes a quality of service of data to be communicated from the remote UE's 311, 900 to the eNodeB 301 via the relay device 305. Thus as will be appreciated for the example explanation of the communication of data on the uplink via the relay device 305 provided with reference to FIGS. 7 and 8, a triggering of transmission of buffer status reports and the consequential communication of data from the buffers of the remote UE's 311, 900 can occur following a predetermined time or a predetermined trigger event depending upon the quality of service of data communicated from each of the remote UE's 311, 900 to the relay device 305.

As shown in FIG. 10 in a second step represented by arrows 1002, each of the remote UEs 311, 900 transmits an indication of its buffer status indicating an amount of data present in each of the buffers 702, 902 within the remote UE's 311, 900 to the relay device 305. The relay device 305 then combines the buffer status report messages from each of the remote UE's 311, 900 to form an aggregated buffer status report as if this was an indication of the amount of data present in a single buffer and therefore a representation of an amount of communications resources required to communicate that data. As represented by an arrow 1004 an aggregate of the buffer status reports is transmitted from the relay device 305 to the eNodeB 301. The eNodeB 301 then uses the aggregated buffer status reports to determine an amount of communications resources required for communication of the data from the remote UE's 311, 900 to the relay device 305 and then from the relay device 305 to the eNodeB 301 on the uplink. Accordingly the eNodeB 301 transmits an allocation of resources e.g. in the form of a resource pool to the communications device for the sidelink between the communications device 305 and the remote UE's 311, 900 as represented by the arrow 1006. The relay device 305 transmits an allocation of communications resources to each of the remote UE's 311, 900 allocating communications resources for communicating the data from the buffers 702, 902 to the relay device 305 as represented by an arrow 1008.

As per the example already explained above with reference to FIGS. 7 and 8, data is then transmitted from each of the remote UEs 311, 900 on the sidelink to the relay device 305 and stored within the receive buffer of the relay device 305 for transmission onto the eNodeB 301 as represented by arrows 1012.

Figure 11:
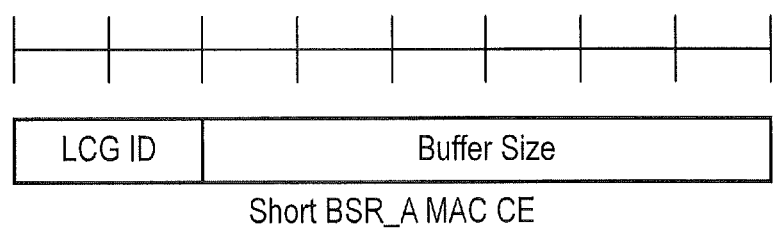
FIG. 11 is an example representation of a short buffer status report message transmitted from a remote communications device to a relay device.
Figure 12:
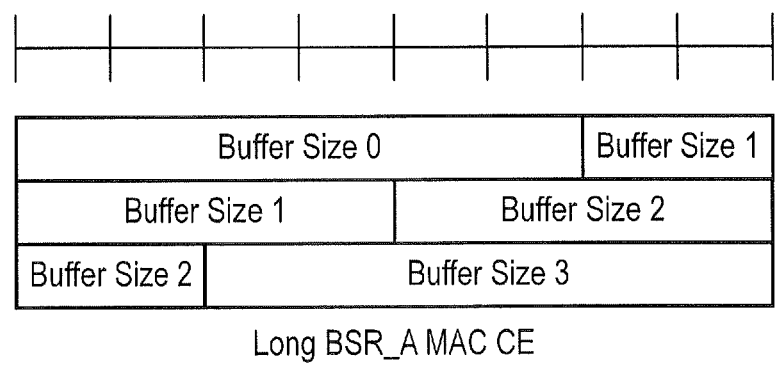
FIG. 12 is an example representation of a long buffer status report message illustrating a plurality of buffer sizes of each of a plurality of remote communications devices.

FIG. 11 provides an example representation of a form of short buffer status report message transmitted from each of the remote UE's 311, 900 to the relay device 305. FIG. 12 provides an illustrative representation of an indication of different buffer sizes as represented by a long buffer status report message. As shown in FIG. 11 an example of a buffer status report (BSR) message BSR_A MAC CE could have a short BSR format, or the long BSR format including buffer status of all the logical channel groups within the UE as in FIG. 12. Both of the examples shown in FIGS. 11 and 12 indicate the buffer status of each LCG mainly for the UE-to-Network relay. In other examples the LCG ID may be extended if necessary.

The buffer status report from remote UE to UE-to-Network relay (refer to as BSR_A) can indicate
(1) A potentially required transmission resource amount (amount of data) required for the access link for this UE.
(2) A potentially required transmission resource amount (amount of data) on the backhaul link (relay to network link), especially together with BSR_A from other serving remote UEs, an indication is provided of the total amount of required resources for the relaying traffic.

FIG. 13 provides an example illustration of a form of a combined buffer status report message illustrating the size of buffers corresponding to each logical channel group with a different destination index. In other examples a relay device could work as UE-to-UE relay as an intermediate device between remote UEs. For the example of the buffer status report of FIGS. 11 and 12, BSR_A, it may be necessary to differentiate the UE-to-Network relay traffic with UE-to-UE relay traffic. Accordingly, a buffer status report in the format shown in FIG. 13 can be adopted as an example.

If the BSR_A contains the transmission resource amounts whose destination is the other remote UE via the relay (the relay works as an UE-to-UE relay), it can indicate:
(1) The potentially required resource amounts on the link from this sending UE to the relay.
(2) The potentially required resource amounts on the link from relay to destination remote UE.

After receiving BSR_A from remote UEs, the relay node could:
(1) As an UE-to-Network relay, allocate resources for the access link from remote UE to relay.
(2) As an UE-to-UE relay, allocate resources for the link from BSR sending UE to relay.
(3) As an UE-to-UE relay, reserve resources for the link from relay to destination UE as indicated in the buffer status report.
(4) Collect the buffer status reports from its served UEs and prepare to send aggregated BSR to its serving eNB.

Figure 14:
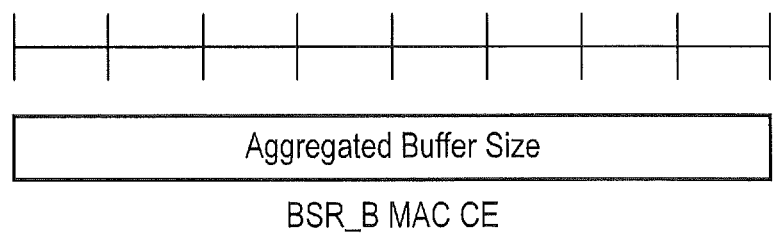
FIG. 14 is an example representation of a buffer status report message illustrating an aggregated buffer size.
Figure 15:
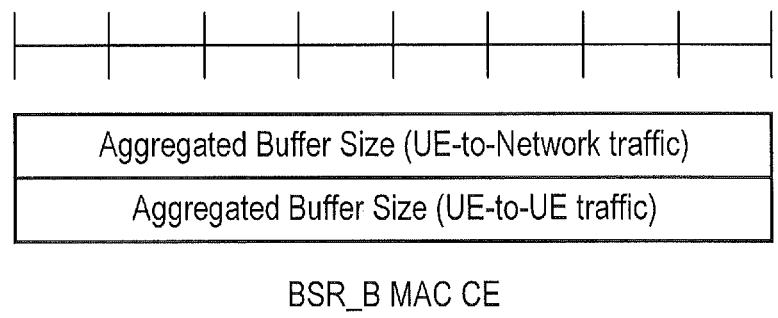
FIG. 15 is an example representation of an aggregated buffer status report message which contains an aggregated buffer size for communication to infrastructure equipment and also an aggregated buffer size of transmission of uplink data from remote communications devices via a relay device to other remote communications devices.

FIG. 14 provides an example representation of every aggregated buffer size and buffer size message whereas FIG. 15 provides an aggregated buffer size for UE to network traffic and an aggregated buffer size of UE to UE traffic. According to the examples of the buffer status reports provided in FIGS. 14 and 15 a buffer status report transmitted from the relay device to a serving eNodeB can indicate an aggregated buffer status of the UEs communicating via that relay device. The buffer status report can also indicate communications resources which may potentially be required in the future.

The buffer status reports can also provide an indication of a total amount of required communications resources for its served remote UEs, for both UE-to-Network traffic and UE-to-UE traffic. These are represented in FIGS. 14 and 15 which provide example formats of buffer status reports BSR_B. In other examples a new LCID(s) can be used.

It should be noted that besides the relayed traffic, the relay node may have its own data traffic to its serving eNodeB. This part of buffer status report could be sent combined with relay buffer status report e.g. BSR_B, or to be sent separately.

In some examples a pre-defined timer may be provided. Before the timer expires, the relay UE can be arranged to collect all the BSR_A from its served UEs and calculate total buffer size of the remote UEs. The timer can be configured by RRC signalling and is preferably longer than the longest periodic BSR timer of its served UEs. In some examples a relay UE can be configured to determine more accurately a total amount of data to be transmitted, which is not based on the buffer size range indicator as implemented in conventional buffer status report of the remote UE.

Embodiments of the present technique can provide an advantage by separating UE-to-Network and UE-to-UE buffer size status. This is because a total data requirement of UE-to-Network and UE-to-UE can be provided and used for the semi-persistent resource pool allocation for a relay device while the UE-to-Network traffic indication can be used for the uplink grant allocation for the relay device.

According to some example embodiments, after receiving a buffer status report BSR_B from relay devices, the serving eNB could:

(1) Adjust semi-persistent resource pool allocations for relay devices.
(2) Reserve/pre-allocate uplink grant for the relay to send data, e.g. to reduce the delay.
(3) Activate new relays to offload certain overloaded relays, or to deactivate certain relays.

In some example embodiments buffer status reports are transmitted from UEs to the serving eNodeB, so that the serving eNodeB can acquire the buffer status information for the remote UE. This information can then be used for example to activate another relay node for UE-to-Network traffic, or to activate/change a new UE-to-UE relay. An indication of a link quality between new candidate relay nodes can be useful in order to make a selection. According to predetermined criteria the selection of UE-to-Network relay and UE-to-UE relay can be different. For example, the selection of a UE-to-Network relay can depend on for example (1) A link quality between a remote UE and a candidate relay device, which can be a UE acting as a relay device.
(2) A link quality between a candidate relay and its serving eNodeB.

For the selection of a UE-to-UE relay, other criteria can be used such as a link quality between a candidate relay device and a remote UE. As such, in some embodiments these additional criteria can be used to select an appropriate route for data transmitted on the uplink either via another remote UE or directly to the eNodeB. According to some embodiments the link quality of the remote UE with its sidelink neighbours can be measured using the reference signal received power (RSRP) of a sidelink synchronization signal. This indication of a quality metric value can be reported by the remote UE in addition to the buffer status report.

In order to distinguish data to be transmitted on the uplink from UE-to-Network or UE-to-UE relay, a buffer status report can be generated, based on the example shown in FIG. 13, for transmission from a remote UE to its serving eNodeB. To this end, a new LCID(s) can be used.

After receiving a buffer status report and a link quality report from a remote UE, a serving eNodeB could for example (1) Activate a new UE-to-Network relay device for UEs with a large buffer size reporting to their current UE-to-Network relays where a candidate relay device has good link qualities with these overloaded UEs.
(2) Activate a new UE-to-UE relay device for the UEs with large buffer size reporting to their current UE-to-UE relay device where a candidate relay device has good link qualities for both of the transmission and reception UEs.
(3) In combination with an indication of a sidelink buffer status report, activate a UE-to-UE relay device for an overloaded sidelink, and a candidate relay device has a good link quality with both of the transmission and reception UEs.

As indicated above, embodiments of the present technique can provide an arrangement for selectively activating new relay devices as a function of a status of buffers for receiving data to be transmitted from remote UEs and as a function of a communications channel (link quality) between a new candidate relay device. To this end, a quality measure can be provided between remote communications devices (UE) nodes and a candidate relay device to an infrastructure equipment of the mobile communications network. According to one example an infrastructure equipment such as an eNodeB may collect some measurements reports from nearby candidate UEs which can act as relay devices. These measurement reports can provide an indication of received signal strength, which is associated with the identifier of the candidate relay device. Furthermore, the eNodeB may be aware of existing nearby UEs already acting as relay devices, which can be used to cross-verify the link quality with the candidate UE relay devices.

In other examples, the eNodeB may also evaluate new candidate paths based on overall channel conditions (UE-to-UE relay and UE relay-to-eNodeB and BSR availability).

As will be appreciated from the above explanation, in some example embodiments the relay device is configured to receive a buffer status report message from the remote UE, and then to receive uplink data from the remote UE for transmission to the eNodeB. The relay device stores the received uplink data in the buffer for transmission to the eNodeB and transmits to the eNodeB a representation of the buffer status report message received from the remote UE and indicates that the relay device has uplink data for transmission to the eNodeB. The relay device then receives an indication of communications resource in which the uplink data is to be transmitted from the relay device to the eNodeB, and transmits the uplink data from the buffer to the infrastructure equipment in the indicated communications resources. The eNodeB may also receive an indication of a link quality from one or more other UEs and based on an available link quality and an amount of data to be transmitted as provided by the buffer status report message, the eNodeB may activate another of the communications devices to act as a relay device.

In other embodiments the relay device is configured to receive an indication of an allocated pool of communications resources from the eNodeB, the allocated pool of communication resources being for allocation by the relay device to one or more remote communications devices to transmit uplink data to the relay device. The relay device then receives a buffer status report message from one of the remote UEs, allocates communications resources from the pool of communications resources allocated by the eNodeB for the remote UE to transmit the uplink data to the relay device, receives uplink data from the remote UE for transmission to the eNodeB, stores the received uplink data in the buffer, which should be transmitted to the eNodeB, and transmits the uplink data from the buffer to the eNodeB in the indicated communications resources.

The following numbered paragraphs provide further example aspects and features of the present technique:

Paragraph 1. A communications device acting as a relay device configured to communicate with an infrastructure equipment of a mobile communications network and a remote communications device operating with the mobile communications network, the communications device acting as the relay device comprising a receiver configured to receive signals representing data from the infrastructure equipment for transmission to the remote communications device, a transmitter configured to transmit signals representing the received data to the remote communications device, a controller configured to control the transmitter to transmit the signals to the remote communications device and to control the receiver to receive the signals from the infrastructure equipment, and a buffer configured to store the data received from the infrastructure equipment, wherein the controller is configured in combination with the transmitter, the receiver and the buffer to detect that data stored in the buffer should be transmitted to the remote communications device, to transmit to the remote communications device a buffer status report message indicating that the communications device acting as a relay node has data for transmission to the remote communications device, to receive in response to the buffer status response message a scheduling request message from the remote communications device, to transmit an indication of communications resource to the remote communications device in which the data is to be transmitted, and to transmit the data from the buffer to the remote communications device in the indicated communications resources.

Paragraph 2. A communications device acting as a relay node according to paragraph 1, wherein the controller is configured to detect that data stored in the buffer should be transmitted to the remote communications device in accordance with one or more predetermined conditions.

Paragraph 3. A communications device acting as a relay node according to paragraph 2, wherein the controller is configured in combination with the receiver to receive from the infrastructure equipment an indication of a quality of service with which the data is to be communicated to the remote communications device, the indication of the quality of service including whether the data is delay tolerant or non-delay tolerant, and one of the one or more predetermined conditions comprises whether the data is delay tolerant or non-delay tolerant, and the controller is configured in combination with the transmitter, the receiver and the buffer to determine whether the data stored in the buffer is delay tolerant in accordance with the indicated quality of service, and if the data is delay tolerant, to wait for a predetermined time before transmitting the buffer status report message, or if the data is non-delay tolerant to transmit the buffer status report message to the remote communications device without delay.

Paragraph 4. A communications device acting as a relay node according to paragraph 2, wherein the controller is configured in combination with the receiver to receive from the infrastructure equipment an indication of a quality of service with which the data is to be communicated to the remote communications device, the indication of the quality of service including whether the data is delay tolerant or non-delay tolerant, and one of the one or more predetermined conditions comprises whether the data is delay tolerant or non-delay tolerant, and the controller is configured in combination with the transmitter, the receiver and the buffer to determine whether the data stored in the buffer is delay tolerant in accordance with the indicated quality of service, and if the data is delay tolerant, to wait for a predetermined time before transmitting the data, or if the data is non-delay tolerant to transmit the data to the remote communications device without delay.

Paragraph 5. A communications device acting as a relay node according to paragraph 3, wherein the controller is configured in combination with the transmitter, the receiver and the buffer to receive data for transmission to the remote communications from the infrastructure equipment during the waiting for the predetermined time, to store the data in the buffer, and to transmit the data received during the predetermined time in the indicated communications resources from the buffer to the remote communications device.

Paragraph 6. A communications device acting as a relay node according to paragraph 5, wherein the controller is configured in combination with the transmitter, the receiver and the buffer to monitor a quantity of the data stored in the buffer, and if the quality of data stored in the buffer exceeds a predetermined maximum amount, and to transmit the data received in the indicated communications resources from the buffer to the remote communications device before the end of the predetermined time.

Paragraph 7. A communications device acting as a relay node according to any of paragraphs 1 to 6, wherein the controller is configured in combination with the transmitter, the receiver and the buffer to wait for a second predetermined time to receive the scheduling request message from the remote communications device, for allowing the remote communications device to receive the data when predetermined conditions have been satisfied, and if the scheduling request message has not been received within the second predetermined time, to re-transmit the buffer status report message.

Paragraph 8. A communications device configured to receive data from a relay device, the communications device comprising a receiver configured to receive signals representing data from the relay device, a transmitter configured to transmit signals to the relay device, and a controller configured to control the transmitter to transmit the signals to the relay device and to control the receiver to receive the signals from the relay device, wherein the controller is configured in combination with the receiver and the transmitter to receive from the relay device a buffer status report message indicating that the relay device has data stored in a buffer for transmission to the communications device, to determine in response to the buffer status response message whether the communications device should receive the data from the buffer of the relay device, to transmit in response to the buffer status response message a scheduling request message to the relay device, to receive an indication of communications resource from the relay device in which the data is to be received, and to receive the data from the buffer of the relay device in the indicated communications resources.

Paragraph 9. A communications device according to paragraph 8, wherein the controller is configured to determine in response to the buffer status response message whether the communications device should receive the data from the buffer of the relay device in accordance with one or more predetermined conditions.

Paragraph 10. A communications device according to paragraph 9, wherein the one or more predetermined conditions include one or more of an amount of power available to the communications device, a state of radio communications conditions for receiving the data, or a delay tolerance of the data.

Paragraph 11. A method of transmitting data received by a communications device acting as a relay device from an infrastructure equipment of a mobile communications network to a remote communications device, the method comprising receiving signals representing data from the infrastructure equipment for transmission to the remote communications device, storing the data for transmission to the remote communications device in a buffer, and transmitting signals representing the received data to the remote communications device, wherein the transmitting the data to the remote communications device comprises detecting that data stored in the buffer should be transmitted to the remote communications device, transmitting to the remote communications device a buffer status report message indicating that the communications device acting as a relay node has data for transmission to the remote communications device, receiving in response to the buffer status response message a scheduling request message from the remote communications device, transmitting an indication of communications resource to the remote communications device in which the data is to be transmitted, and transmitting the data from the buffer to the remote communications device in the indicated communications resources.

Paragraph 12. A communications device acting as a relay device configured to communicate with an infrastructure equipment of a mobile communications network, the communications device acting as the relay device comprising a receiver configured to receive signals representing data from a remote communications device for transmission to the infrastructure equipment, a transmitter configured to transmit signals representing the received data to the infrastructure equipment, a controller configured to control the transmitter to transmit the signals to the infrastructure equipment and to receive the signals from the remote communications device to relay uplink data from the remote communications device to the infrastructure equipment, and a buffer configured to store the data received from the remote communications device, wherein the controller is configured in combination with the transmitter, the receiver and the buffer to detect that uplink data received from the remote communications device and stored in the buffer should be transmitted to the infrastructure equipment, to transmit to the infrastructure equipment a buffer status report message indicating that the communications device acting as a relay node has uplink data for transmission to the infrastructure equipment, to receive in response to transmitting the buffer status response message an indication of communications resource in which the uplink data is to be transmitted, and to transmit the data from the buffer to the infrastructure equipment in the indicated communications resources.

Paragraph 13. A communications device acting as a relay node according to paragraph 12, wherein the controller is configured to detect that the uplink data stored in the buffer should be transmitted to the receiving communications device in accordance with one or more predetermined conditions.

Paragraph 14. A communications device acting as a relay node according to paragraph 13, wherein the controller is configured in combination with the receiver to receive from the remote communications device an indication of a quality of service with which the data is to be communicated to the infrastructure equipment, the indication of the quality of service including whether the data is delay tolerant or non-delay tolerant, and one of the one or more predetermined conditions comprises whether the data is delay tolerant or non-delay tolerant, and the controller is configured in combination with the transmitter, the receiver and the buffer to determine whether the uplink data stored in the buffer is delay tolerant in accordance with the indicated quality of service, and if the data is delay tolerant, to wait for a predetermined time before transmitting the buffer status report message, or if the data is non-delay tolerant to transmit the buffer status report message to the receiving communications device without delay.

Paragraph 15. A communications device acting as a relay device configured to communicate with an infrastructure equipment of a mobile communications network, the communications device acting as the relay device comprising a receiver configured to receive signals representing uplink data from one or more remote communications devices for transmission to the infrastructure equipment, a transmitter configured to transmit signals representing the uplink data to the infrastructure equipment, a controller configured to control the transmitter to transmit the signals to the infrastructure equipment and to receive the signals from the one or more remote communications devices to relay the uplink data from the one or more remote communications device to the infrastructure equipment, and a buffer configured to store the uplink data received from the one or more remote communications devices, wherein the controller is configured in combination with the transmitter and the receiver to receive from the one or more of the remote communications device a buffer status report message indicating an amount of uplink data that the remote communications device has for transmission to the infrastructure equipment via the communications device acting as a relay node, to transmit in response to the buffer status response message received from the one or more remote communications devices an aggregated buffer status report message representing an amount of uplink data for transmission to the infrastructure equipment from the one or more remote communications devices, and to transmit the uplink data received from the one or more remote communications devices to the infrastructure equipment in communications resources allocated in accordance with the aggregated buffer status report.

Paragraph 16. A communications device according to paragraph 15 or 16, wherein the controller in combination with the transmitter and the receiver are configured to receive an indication of the allocated communications resources from the infrastructure equipment for transmitting the uplink data from the buffer of the communications device to the infrastructure equipment, and to transmit the uplink data to the infrastructure equipment using the communications resources allocated in accordance with the aggregated buffer status report.

Numerous modifications and variations of the present disclosure are possible in light of the above teachings. It is therefore to be understood that within the scope of the appended claims, the disclosure may be practiced otherwise than as specifically described herein.

In so far as embodiments of the disclosure have been described as being implemented, at least in part, by software-controlled data processing apparatus, it will be appreciated that a non-transitory machine-readable medium carrying such software, such as an optical disk, a magnetic disk, semiconductor memory or the like, is also considered to represent an embodiment of the present disclosure.

It will be appreciated that the above description for clarity has described embodiments with reference to different functional units, circuitry and/or processors. However, it will be apparent that any suitable distribution of functionality between different functional units, circuitry and/or processors may be used without detracting from the embodiments.

Described embodiments may be implemented in any suitable form including hardware, software, firmware or any combination of these. Described embodiments may optionally be implemented at least partly as computer software running on one or more data processors and/or digital signal processors. The elements and components of any embodiment may be physically, functionally and logically implemented in any suitable way. Indeed the functionality may be implemented in a single unit, in a plurality of units or as part of other functional units. As such, the disclosed embodiments may be implemented in a single unit or may be physically and functionally distributed between different units, circuitry and/or processors.

Although the present disclosure has been described in connection with some embodiments, it is not intended to be limited to the specific form set forth herein. Additionally, although a feature may appear to be described in connection with particular embodiments, one skilled in the art would recognize that various features of the described embodiments may be combined in any manner suitable to implement the technique.

REFERENCES

[1] LTE for UMTS: OFDMA and SC-FDMA Based Radio Access, Harris Holma and Antti Toskala, Wiley 2009, ISBN 978-0-470-99401-6.
[2] RP-151621, "New Work Item: NarrowBand IOT NB-IOT," Qualcomm, RAN #69.
[3] RP-160677, "Further Enhancements to LTE Device to Device, UE to Network Relays for IoT and Wearables," Qualcomm et al, RAN #71.

What is claimed is:

1. A communications device acting as a relay device configured to communicate with an infrastructure equipment of a mobile communications network and with a remote communications device operating with the mobile communications network, the communications device comprising:

a receiver configured to receive first signals representing data from the infrastructure equipment for transmission to the remote communications device;

a transmitter configured to transmit second signals, representing the data, to the remote communications device;

a control circuit configured to control the transmitter to transmit the second signals to the remote communications device and to control the receiver to receive the first signals from the infrastructure equipment; and a buffer configured to store the data received from the infrastructure equipment, wherein the control circuit, in combination with the transmitter, the receiver and the buffer, is configured to:

detect that the data stored in the buffer should be transmitted to the remote communications device;

transmit, to the remote communications device, a buffer status report message indicating that the communications device has the data for transmission to the remote communications device;

receive, in response to the buffer status response message, a scheduling request message from the remote communications device;

transmit an indication, that identifies communications resources, to the remote communications device; and transmit the data to the remote communications device in the communications resources identified in the indication.

2. The communications device as claimed in claim 1, wherein the control circuit is configured to detect that the data stored in the buffer should be transmitted to the remote communications device in accordance with one or more predetermined conditions.

3. The communications device as claimed in claim 2, wherein the control circuit, in combination with the transmitter, the receiver and the buffer, is configured to receive, from the infrastructure equipment, an indication of a quality of service with which the data is to be communicated to the remote communications device, the indication of the quality of service including whether the data is delay tolerant or non-delay tolerant, and one of the one or more predetermined conditions comprises whether the data is delay tolerant or non-delay tolerant, determine whether the data stored in the buffer is delay tolerant in accordance with the indication of the quality of service, in a case that the data is delay tolerant, wait for a predetermined time before transmitting the buffer status report message, and in a case that the data is non-delay tolerant, transmit the buffer status report message to the remote communications device without delay.

4. The communications device as claimed in claim 2, wherein the control circuit, in combination with the transmitter, the receiver and the buffer, is configured to receive, from the infrastructure equipment, an indication of a quality of service with which the data is to be communicated to the remote communications device, the indication of the quality of service including whether the data is delay tolerant or non-delay tolerant, and one of the one or more predetermined conditions comprises whether the data is delay tolerant or non-delay tolerant, determine whether the data stored in the buffer is delay tolerant in accordance with the indication of the quality of service,
in a case that the data is delay tolerant, wait for a predetermined time before transmitting the data, and
in a case that the data is non-delay tolerant, transmit the data to the remote communications device without delay.

5. The communications device as claimed in claim 3, wherein the control circuit, in combination with the transmitter, the receiver and the buffer, is configured to
receive data for transmission to the remote communications from the infrastructure equipment during the waiting for the predetermined time,
store the data in the buffer, and
transmit the data received during the predetermined time in the indicated communications resources from the buffer to the remote communications device.

6. The communications device as claimed in claim 5, wherein the control circuit, in combination with the transmitter, the receiver and the buffer, is configured to
monitor a quantity of the data stored in the buffer, and
in a case that the quality of data stored in the buffer exceeds a predetermined maximum amount, transmit the data received in the indicated communications resources from the buffer to the remote communications device before the end of the predetermined time.

7. The communications device as claimed in claim 1, wherein the control circuit, in combination with the transmitter, the receiver and the buffer, is configured to
wait for a second predetermined time to receive the scheduling request message from the remote communications device, for allowing the remote communications device to receive the data in a case that predetermined conditions have been satisfied, and
in a case that the scheduling request message has not been received within the second predetermined time, re-transmit the buffer status report message.

8. A communications device, comprising
a receiver configured to receive first signals, representing data, from a relay device;
a transmitter configured to transmit second signals to the relay device; and
a control circuit configured to control the transmitter to transmit the first signals to the relay device and to control the receiver to receive the second signals from the relay device, wherein
the control circuit, in combination with the receiver and the transmitter, is configured to
receive, from the relay device, a buffer status report message indicating that the relay device has data stored in a buffer for transmission to the communications device;
determine, in response to receiving the buffer status response message, whether the communications device should receive the data from the buffer of the relay device;
transmit, in response to the buffer status response message, a scheduling request message to the relay device;
receive an indication, that identifies communications resources in which the data is to be received, from the relay device; and
receive the data from the buffer of the relay device in the communications resources identified in the indication.

9. The communications device as claimed in claim 8, wherein the control circuit is configured to determine, in response to the buffer status response message, whether the communications device should receive the data from the buffer of the relay device in accordance with one or more predetermined conditions.

10. The communications device as claimed in claim 9, wherein the one or more predetermined conditions include one or more of an amount of power available to the communications device, a state of radio communications conditions for receiving the data, or a delay tolerance of the data.

11. A method of communicating using a communications device acting as a relay device, the method comprising:
receiving a buffer status report message from a remote communications device;
receiving uplink data, from the remote communications device, for transmission to an infrastructure equipment;
storing the uplink data, which should be transmitted to the infrastructure equipment, in a buffer;
transmitting, to the infrastructure equipment, a representation of the buffer status report message, the representation of the buffer status report message indicating that the communications device has uplink data for transmission to the infrastructure equipment;
receiving, from the infrastructure equipment in response to the transmitted buffer status report message, an indication that identifies communications resources in which the uplink data is to be transmitted from the communications device to the infrastructure equipment; and
transmitting the uplink data, from the buffer, to the infrastructure equipment in the communications resources identified in the indication.

* * * * *